United States Patent
Ura

(10) Patent No.: US 6,818,025 B1
(45) Date of Patent: Nov. 16, 2004

(54) RECHARGEABLE BATTERY HAVING A CURRENT COLLECTOR INTEGRALLY FORMED AND CONTACTING A CURRENT COLLECTOR PLATE TO FORM A FLAT PLANE

(75) Inventor: Toshikazu Ura, Minoo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/719,323

(22) PCT Filed: Apr. 7, 2000

(86) PCT No.: PCT/JP00/02304

§ 371 (c)(1),
(2), (4) Date: Jan. 4, 2001

(87) PCT Pub. No.: WO00/62356

PCT Pub. Date: Oct. 19, 2000

(30) Foreign Application Priority Data

Apr. 8, 1999 (JP) .......................... 11/100750

(51) Int. Cl.⁷ ............................... H01M 2/26
(52) U.S. Cl. ................. 29/623.1; 429/94; 429/161; 429/211
(58) Field of Search .............. 429/94, 161, 211; 29/623.1

(56) References Cited

U.S. PATENT DOCUMENTS 3,761,314 A * 9/1973 Cailley ....................... 429/211
4,332,867 A * 6/1982 Tsuda et al. ................ 429/94
5,972,532 A 10/1999 Oweis et al.
6,371,995 B1 * 4/2002 Yasunami ................. 29/623.1

FOREIGN PATENT DOCUMENTS

| JP | 47-1520 | 1/1972 |
| JP | 55-113261 | 9/1980 |
| JP | 4-301360 | 10/1992 |
| JP | 7-014569 | * 1/1995 |
| JP | 08-115744 | 5/1996 |
| JP | 10-021953 | 1/1998 |
| JP | 2000-21436 | 1/2000 |
| JP | 2000-58038 | 2/2000 |
| JP | 2000-058038 | * 2/2000 |
| WO | WO-97/30487 | * 8/1997 |

OTHER PUBLICATIONS

JPO Machine Translation for JP 10–021953 A (Jan. 1998).*

* cited by examiner

*Primary Examiner*—Susy Tsang-Foster
(74) *Attorney, Agent, or Firm*—Jordan and Hamburg LLP

(57) ABSTRACT

In a rechargeable battery in which an electrode plate group obtained by superimposing a positive electrode plate, in which positive electrode material is attached to a positive electrode current collector, and a negative electrode plate, in which negative electrode material is attached to a negative electrode current collector, with a separator therebetween is accommodated in a battery container together with electrolyte, the current collectors of the electrode plates are respectively projected at opposite ends of the electrode plate group, forming by themselves flat planes by being pressed, and current collecting plates are joined to these flat planes.

4 Claims, 5 Drawing Sheets

RECHARGEABLE BATTERY HAVING A CURRENT COLLECTOR INTEGRALLY FORMED AND CONTACTING A CURRENT COLLECTOR PLATE TO FORM A FLAT PLANE

TECHNICAL FIELD

The present invention relates to rechargeable batteries, and in particular to rechargeable batteries wherein an electrode plate group obtained by superimposing a positive electrode plate, in which positive electrode material is attached to a current collector, onto a negative electrode plate, in which negative electrode material is attached to a current collector, with a separator therebetween, is accommodated in a battery container together with electrolyte.

BACKGROUND ART

In recent years, there has been rapid progress in reducing the size and weight of electronic equipment, which has increased demands to reduce the size and weight and increase the capacity of the batteries used as their power sources.

To meet these demands, lithium ion rechargeable batteries employing a carbon-based material as the negative electrode active material and a transition metal oxide containing lithium, such as $LiCoO_2$, as the positive electrode active material have been put into practice by various companies. Lithium rechargeable batteries in which metallic lithium or lithium alloy is employed as the negative electrode active material had the problem that the lithium precipitated on the negative electrode as charging proceeded. On the other hand, lithium ion rechargeable batteries are free of such problem and so have excellent cycle characteristics. As a result, there has been vigorous development of lithium ion rechargeable batteries and their use in electronic equipment has become more common.

Lithium rechargeable batteries are studied also as a means for solving global environmental problems or energy problems. As a way of guaranteeing power stability while maintaining a good global environment, implementation of technology for load equalization is desired; considerable benefits in terms of load equalization could be expected if use of small-scale battery power storage devices capable of storing power during the night could be made common in ordinary households etc. In order to prevent atmospheric pollution by car exhaust gases and global warming due to $CO_2$, it would also be desirable to extend the use of electric vehicles in which some or all of the motive power is obtained by rechargeable batteries. Large lithium ion rechargeable batteries with a cell capacity of about 100 Ah are therefore being developed for use as battery power storage devices for domestic use and as power sources for electric vehicles.

The construction of such a lithium ion rechargeable battery is shown in FIG. 5. An electrode plate group 30 constituted by superimposing a positive electrode plate 21, in which positive electrode material 21a is attached to a positive electrode current collector 21b, and a negative electrode plate 22, in which negative electrode material 22a is attached to a negative electrode current collector 22b, wound in spiral fashion with a separator 23 therebetween are accommodated in a battery container 24 comprising a battery case 25 and a battery closure 26 together with electrolyte. A positive electrode current collector tab 28 with one end joined to a suitable location of the positive electrode current collector 21b has its other end connected to the inner surface of the battery closure 26 constituting the positive electrode terminal, while a negative electrode current collector tab 29 with one end joined to a suitable location of the negative electrode current collector 22b has its other end connected to the inside bottom surface of the battery case 25 constituting the negative electrode terminal. An insulating packing 27 is interposed between the inner circumference of the top end aperture of the battery case 25 and the outer circumference of the battery closure 26 so as to mutually insulate the battery case 25 and the battery closure 26 and to seal the battery container 24.

However, since current was extracted from a single location of a positive electrode plate 21 and a negative electrode plate 22 through current collecting tabs 28 and 29 in this structure, the average distance from the positive electrode plate 21 and negative electrode plate 22 to the current collecting tabs 28 and 29 was long. Moreover, the area of current collecting tabs 28 and 29 was small, so their electrical resistance was large and the current collecting efficiency was poor. Furthermore, since the current collecting efficiency was poor, there was the problem that charging and discharging with large currents resulted in increased battery temperatures, which shortens the life of the rechargeable battery.

Laid-open Japanese Patent Application No. 8-115744, for example, discloses an electrode plate group which is directed to solve these problems. In this electrode plate group, current collectors are respectively projected at one side of the electrode plates, with respective leads being attached to the leading ends of these projected portions of the current collectors. Therefore when the electrode plates are wound in spiral fashion, the leads and the end edges of the current collectors respectively form a positive electrode end face and a negative electrode end face at opposite ends of the electrode plate group. Both terminals are connected to the positive electrode end face and the negative electrode end face respectively. However, such structure is subject to the problem of high cost, since leads are required and the manufacturing steps are complicated.

Laid-open Japanese Patent Application No. 10-21953 discloses an arrangement in which current collectors of both electrode plates project respectively on opposite sides and their tips make resilient pressure contact with the positive electrode terminal and negative electrode terminal. However, the connection between the current collectors and the terminals is only effected by the elastic restoring force of the tips of the current collectors, which are bent at an acute angle within a certain range of elasticity. Therefore, the electrical connection is unstable, and the output of the battery also lacks stability under conditions of use in which it is subjected to vibration.

In view of the above problems of the prior art, an object of the present invention is to provide a rechargeable battery wherein the efficiency of current collection is high, the rise in temperature during charging/discharging can be reduced, and in which charging/discharging can be achieved in a stable fashion with an inexpensive construction.

DISCLOSURE OF THE INVENTION

A rechargeable battery according to the present invention comprises: an electrode plate group including a positive electrode plate, in which a positive electrode material is attached to a current collector, a negative electrode plate, in which a negative electrode material is attached to a current collector, the positive and negative electrode plates being superimposed with an intervening separator therebetween, wherein the current collector of one or other of the positive electrode plate and the negative electrode plate is projected on at least one side of the electrode plate group for forming by itself a flat plane on one side of the electrode plate group; an electrolyte; a battery container in which the electrode plate group and the electrolyte are accommodated; and a current collecting plate joined to the flat plane formed at one side of the electrode plate group. Since the current collecting plate is joined to the flat plane formed by a side portion of the current collectors, the current collection efficiency is high and the rise in temperature during charging/discharging can be kept small. Furthermore, since the flat plane is formed by the current collector itself, the construction can be made inexpensive. Moreover, the construction is stable with respect to vibration etc since the current collecting plate is welded to the flat plane of the current collector, so charging and discharging can be effected in a stable fashion.

If the positive electrode plate and the negative electrode plate are wound in spiral fashion with the separator interposed therebetween, with their current collectors being respectively projected at opposite ends of the electrode plate group thereby forming respective projected portions, flat planes can be formed at opposite ends of the electrode plate group efficiently by pressing the projected portions of the current correctors at opposite ends of the electrode plate group in directions along the winding axis of the electrode plate group.

The current collecting plate may be arranged in contact with each of the flat planes and laser-welded in the radial direction at a plurality of locations in the circumferential direction, so that a large number of locations of the side edges of the current collectors can be integrally welded in a simple fashion to the current collecting plates, making it possible to achieve high current collection efficiency with an easy operation.

Alternatively, a plurality of ribs may be formed on the current collecting plate such as to protrude towards the projected portions of the current collectors, the flat planes being formed by pressing the ribs against the projected portions of the current collectors, and the current collecting plate being welded to each of the current collectors at these ribs, so that the current collector plates make reliable contact with the current collectors at these ribs and they can be welded together even more reliably.

BEST MODE FOR CARRYING OUT THE INVENTION

A lithium ion rechargeable battery according to an embodiment of the rechargeable battery of the present invention is described below with reference to FIG. 1 to FIG. 3.

Figure 1:
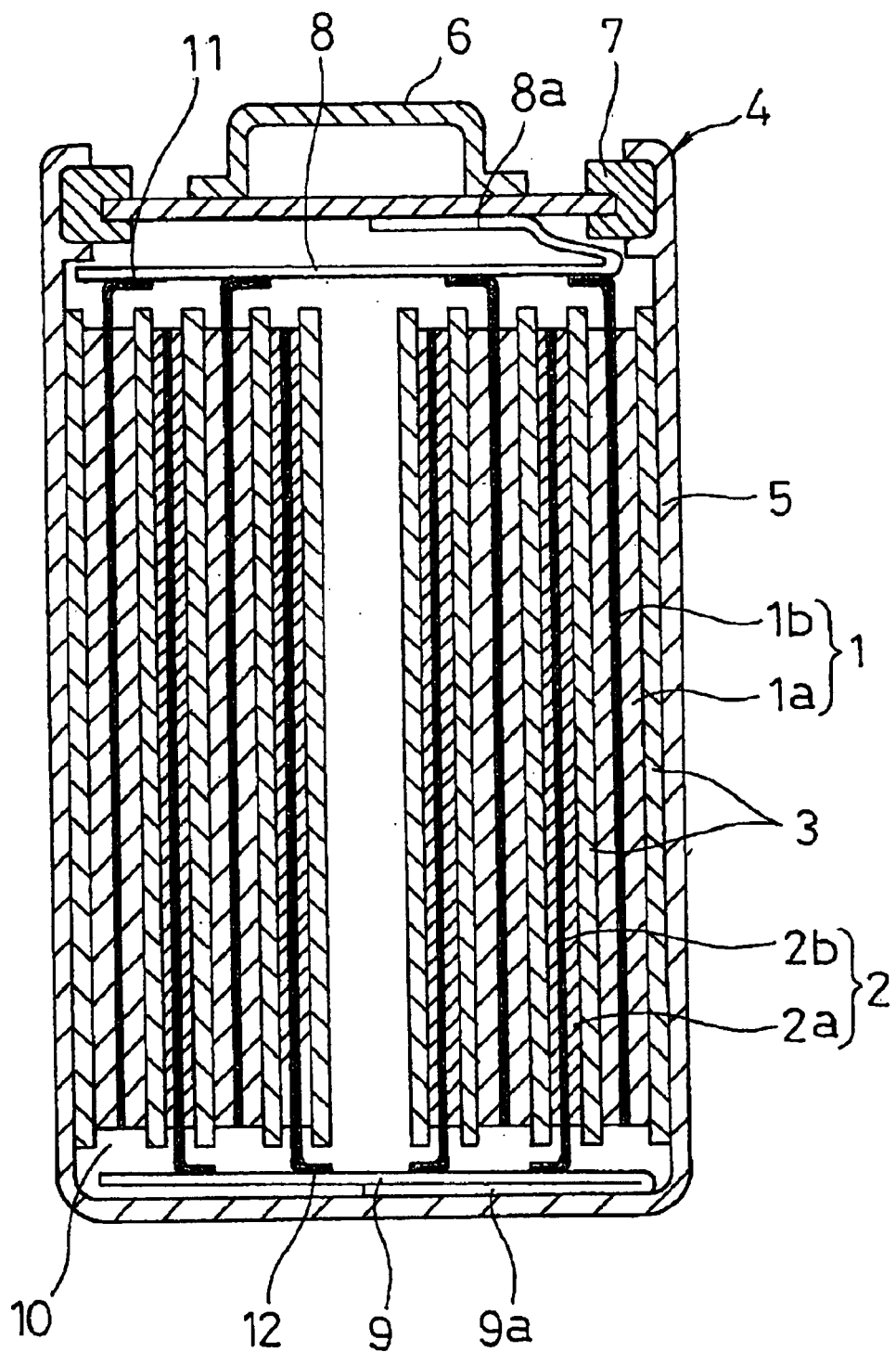
FIG. 1 is an axial cross-sectional view of a rechargeable battery according to one embodiment of the present invention.
Figure 2:
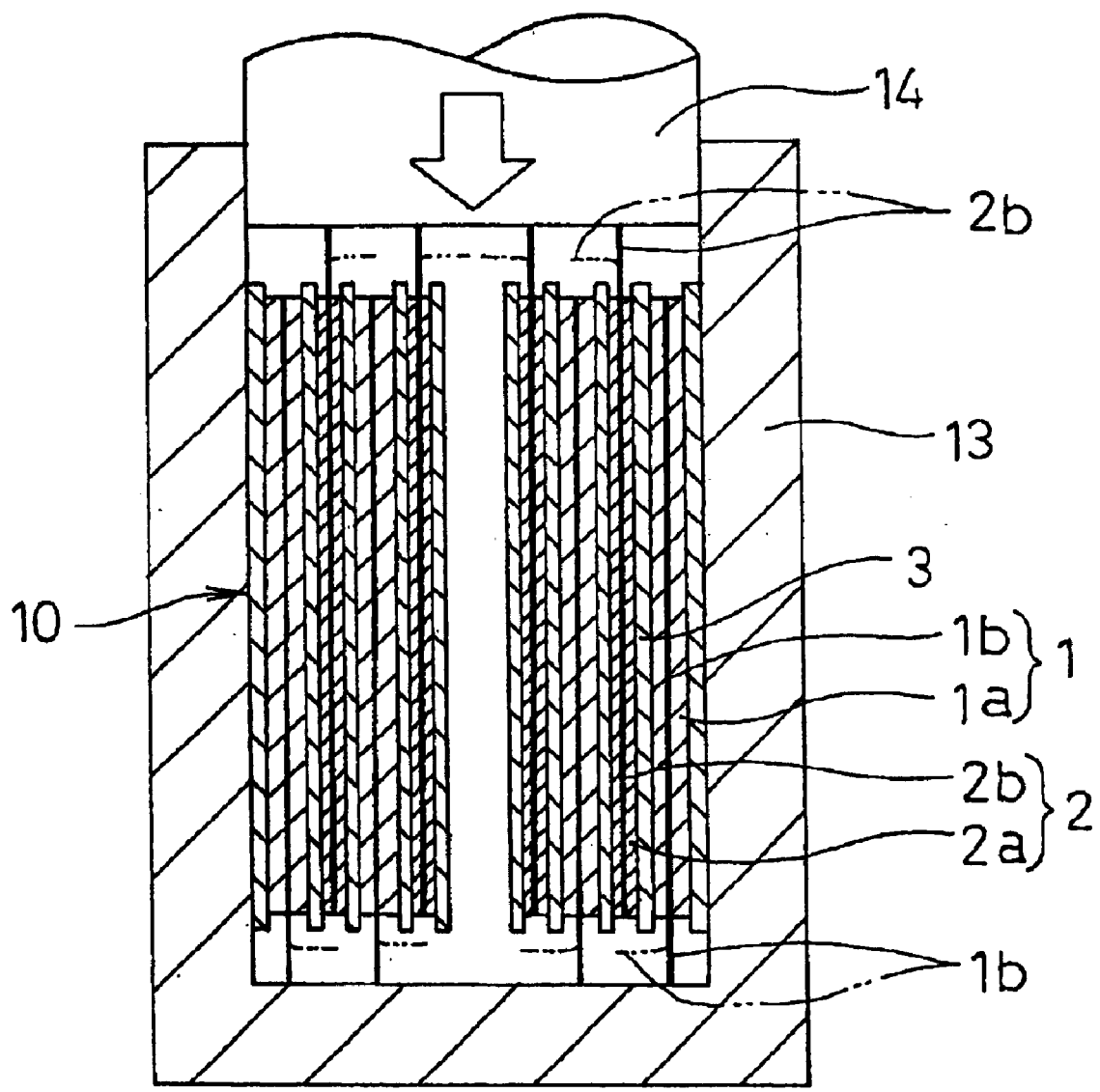
FIG. 2 is an axial cross-sectional view of an electrode plate group in this embodiment in a step wherein a flat plane is formed by the projected portion of a current collector.

In FIG. 1, reference numeral 1 represents a positive electrode plate and reference numeral 2 represents a negative electrode plate. An electrode plate group 10 is constituted by winding in spiral fashion the positive electrode plate 1 and the negative electrode plate 2 in a mutually opposed condition with a separator 3 made of microporous polyethylene film therebetween. This electrode plate group 10 is accommodated within a battery container 4 together with electrolyte. The battery container 4 comprises a battery case 5 which is of cylindrical enclosure shape and constitutes an negative electrode terminal, and a battery closure 6 constituting a positive electrode terminal. An insulating packing 7 is interposed between the inner circumference of the top aperture of the battery case 5 and the outer circumference of the battery closure 6, whereby mutual insulation is effected therebetween and the battery container 4 is sealed. The separator 3 is interposed also between the electrode plate group 10 and the inner circumference of the battery case 5.

The positive electrode plate 1 is constituted by coating both surfaces of a positive electrode current collector 1b with a positive electrode material 1a; a side part (in the example illustrated, the top part) of this positive electrode current collector 1b projects from the portion that is coated with the positive electrode material 1a. The negative electrode plate 2 is constituted by coating both surfaces of a negative electrode current collector 2b with a negative electrode material 2a; a side part opposite from the projected portion of the positive electrode current collector 1b (in the example illustrated, the bottom part) of this negative electrode current collector 2b projects from the portion that is coated with the negative electrode material 2a. The separator 3 projects to the outside beyond both side edges of the coated portions of the positive electrode plate 1 and the negative electrode plate 2.

The side edge of the positive electrode current collector 1b that projects further than the separator 3 is elastically deformed by applying pressure thereto, whereby a flat plane 11 is formed. A positive electrode current collecting plate 8 is joined to this flat plane 11. Likewise, the side edge of the negative electrode current collector 2b that projects further than the separator 3 is elastically deformed by applying pressure thereto, whereby a flat plane 12 is formed, and a negative electrode current collecting plate 9 is joined to this flat plane 12. The positive electrode current collecting plate 8 and the negative electrode current collecting plate 9 are respectively connected to the battery closure 6 and the battery case 5. Reference numerals 8a and 9a respectively denote connecting strips extending from the outer circumference of the current collecting plates 8 and 9 for connecting them to the inside surface of the battery closure 6 and the inside bottom surface of the battery case 5, respectively.

A detailed description of the positive electrode plate 1, the negative electrode plate 2, and the electrolyte will now be given. The positive electrode current collector 1b is made of aluminum foil or the like. The positive electrode plate 1 is constituted by coating both surfaces of the positive electrode current collector 1b with a positive electrode material 1a containing a positive electrode active material and a binder. For the positive electrode active material, $LiCoO_2$, $LiMn_2O_4$, $LiNiO_2$, any other lithium oxide in which one of Co, Mn or Ni is substituted with another transition metal, or a lithium-containing transition metal oxide other than these may be used. In particular, Mn-based lithium-containing transition metal oxides such as the globally abundant low-cost $LiMn_2O_4$ are suitable.

The negative electrode current collector 2b is made of copper foil or the like, and the negative electrode plate 2 is constituted by coating both surfaces of the negative electrode current collector 2b with a negative electrode material 2a containing a negative electrode active material and a binder. For the negative electrode active material, carbon-based materials such as graphite, petroleum coke, carbon fiber, or organic polymer sintered products, or metals or oxides, or composite materials of these capable of occluding and releasing lithium, may be used.

The electrolyte may be obtained by dissolving a lithium salt such as lithium hexafluorophosphate ($LiPF_6$), lithium perchlorate ($LiClO_4$), or lithium fluoroborate ($LiBF_4$) into a non-aqueous solvent such as ethylene carbonate (EC), propylene carbonate (PC), diethylene carbonate (DEC) or ethylene methyl carbonate (EMC), either alone or in combination, at a concentration of 0.5 $mol/dm^3$ to 2 $mol/dm^3$.

To give a specific example, electrolyzed manganese dioxide (EMD: $MnO_2$) and lithium carbonate ($Li_2CO_3$) were mixed at a ratio Li/Mn=1/2 and sintered in the atmosphere of 800° C. for 20 hours, whereby $LiMn_2O_4$ was produced as the positive electrode active material. The positive electrode material 1a was then obtained by mixing, by weight, 92% $LiMn_2O_4$, 3% acetylene black serving as conducting agent, and 5% polyfluorovinylidene as binder. In order to knead the positive electrode material 1a into the form of a paste, the polyfluorovinylidene serving as the binder was employed in the form of N-methylpyrrolidone dispersion. The mixing ratios given above are ratios in terms of the solid fractions. Both faces of the positive electrode current collector 1b made of 20 μm thick aluminum foil were coated with this positive electrode material paste such that positive electrode material layers were formed except a region of width 10 mm on one side edge, which was left uncoated. The film thickness of both positive electrode material layers was the same and the sum of the two film thicknesses after coating and drying was 280 μm, giving a positive electrode plate thickness of 300 μm. After this, the positive electrode plate 1 was compressed using a press roll of diameter 300 mm, to reduce the thickness of the positive electrode plate 1 to 200 μm. The density of the positive electrode material was then 3.0 $g/cm^3$.

For the negative electrode material 2a, a mixture of artificial graphite and styrene butadiene rubber (SBR) as a binder in a weight ratio of 97:3 was employed. In order to knead the negative electrode material 2a into the form of a paste, the styrene butadiene rubber binder was employed in the form of an aqueous dispersion. The above mixing ratios are expressed as solid fractions. Both faces of the negative electrode current collector 2b made of 14 μm thick copper foil were coated with this negative electrode material paste such that negative electrode material layers were formed except a region of width 10 mm on one side edge, which was left uncoated. After this, the negative electrode plate 2 was compressed using a press roll of diameter 300 mm, to reduce the thickness of the negative electrode plate 2 to 170 μm. The density of the negative electrode material was then 1.4 $g/cm^3$.

The electrolyte was obtained by dissolving lithium hexafluorophosphate ($LiPF_6$) as solute in a concentration of 1 $mol/dm^3$ in a solvent obtained by mixing ethylene carbonate (EC) and diethylene carbonate (DEC) in a volume blending ratio of 1:1.

These positive electrode plate 1 and negative electrode plate 2 thus produced are opposed to each other with an intervening separator 3 therebetween and wound around in spiral fashion to form an electrode plate group 10, in such a manner that the portions of the current collectors 1b, 2b which were left uncoated project at opposite ends of the electrode plate group 10. This electrode plate group 10 is inserted and arranged in position in a molding jig 13 of cylindrical enclosure shape as shown in FIG. 2, and is subjected to pressure by a pressing member 14 from one end aperture of the molding jig 13. Thereby, the projected portions of the current collectors 1b, 2b are elastically deformed to be bent radially inwards substantially at 90° as shown by the phantom lines, whereby flat planes 11, 12 are formed at opposite ends of the electrode plate group. Since the positive electrode plate 1 and the negative electrode plate 2 are wound in spiral fashion, the projected portions of the current collectors 1b, 2b are not bent radially outwards. Rather, all of the projected portions of the current collectors are uniformly and progressively bent radially inwards. As a result, although folding may occur to some extent, they are as a whole deformed together into flat planes 11, 12.

Figure 3:
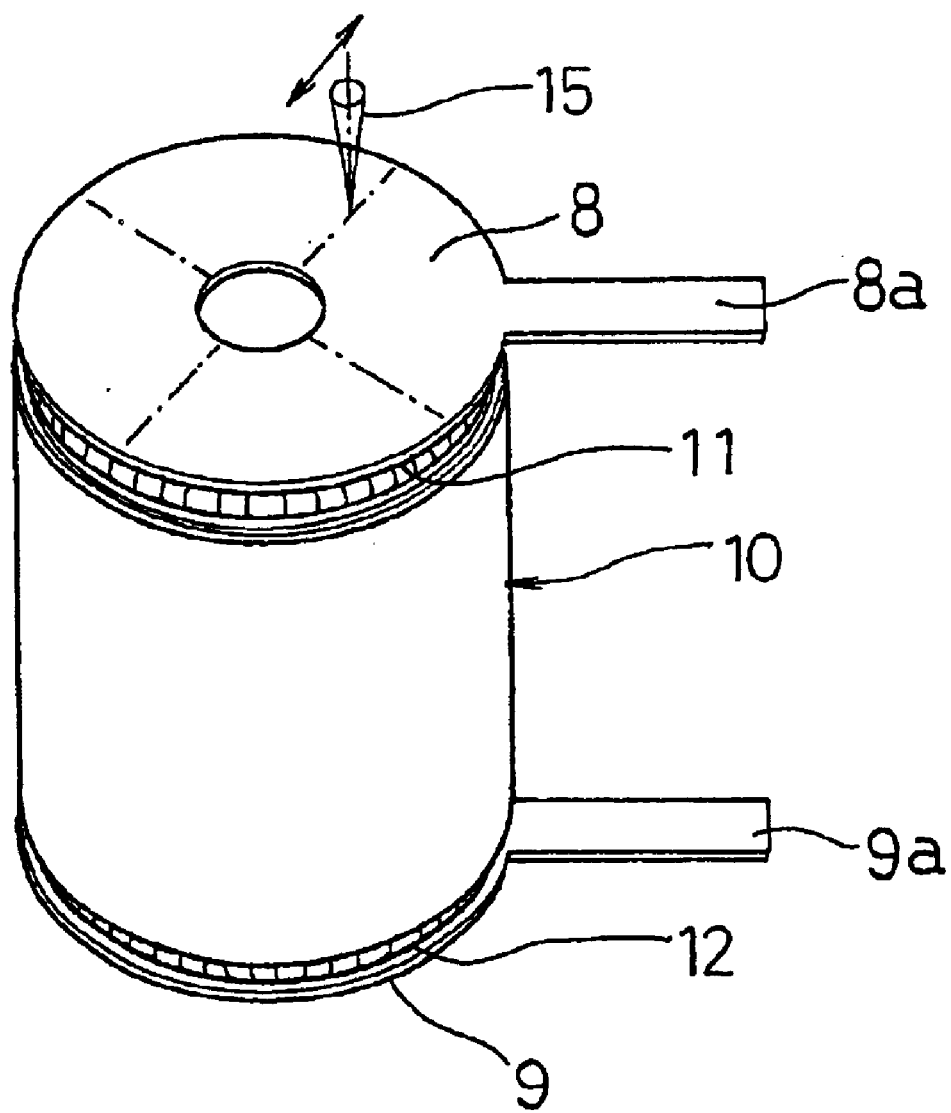
FIG. 3 is a perspective view of the electrode plate group in this embodiment in a step in which the current collecting plate is joined to the flat plane of the current collector.

Next, the electrode plate group 10 formed with flat planes 11, 12 is removed from the molding jig 13 and, as shown in FIG. 3, the current collecting plates 8, 9 are pressed into contact with the flat planes 11, 12, and these are laser welded together by irradiating a plurality of locations in the circumferential direction of the surfaces of the current collecting plates 8, 9 with a laser beam 15 in radial fashion from the middle towards the outer periphery. After this, the electrode plate group 10 with these current collecting plates 8, 9 joined thereto is accommodated within the battery case 5 and vacuum-impregnated with the electrolyte. The current collecting plates 8, 9 are connected by laser welding etc to the battery closure 6 and the battery case 5, respectively, and the battery case 5 is sealed with the battery closure 6.

As described above, the electrode plate group 10 in this lithium ion rechargeable battery is constituted by winding in spiral-fashion a positive electrode plate 1 and a negative electrode plate 2 with a separator 3 therebetween, such that the current collectors 1b, 2b of the two electrode plates respectively project at opposite ends thereof and the current collecting plates 8, 9 are joined to the flat planes 11, 12 formed by the projected portions of the current collectors 1b, 2b. Accordingly, the efficiency of current collection is high and the rise in temperature during charging/discharging can be kept small. Furthermore, since the flat planes 11, 12 are formed by the current collectors 1b, 2b themselves, the construction can be made of low cost. Furthermore, the construction is stable with respect to vibration etc, because these flat planes 11, 12 are welded to the current collecting plates 8, 9, so charging and discharging can be effected in a stable fashion.

Since the flat planes 11, 12 for joining the current collecting plates 8, 9 are formed by applying pressure to both ends of the electrode plate group 10 in the direction along the core of the winding axis, they can be formed efficiently.

The current collecting plates 8, 9 are pressed towards the flat planes 11, 12 and subjected to laser welding in the radial direction at a plurality of locations in the circumferential direction in this tightly pressed condition. Therefore, integral welding of a large number of locations of the side edges of the current collectors 1b, 2b to the current collecting plates 8, 9 can be achieved in a straightforward fashion, enabling high current collection efficiency to be achieved with ease of operation.

Figure 4:
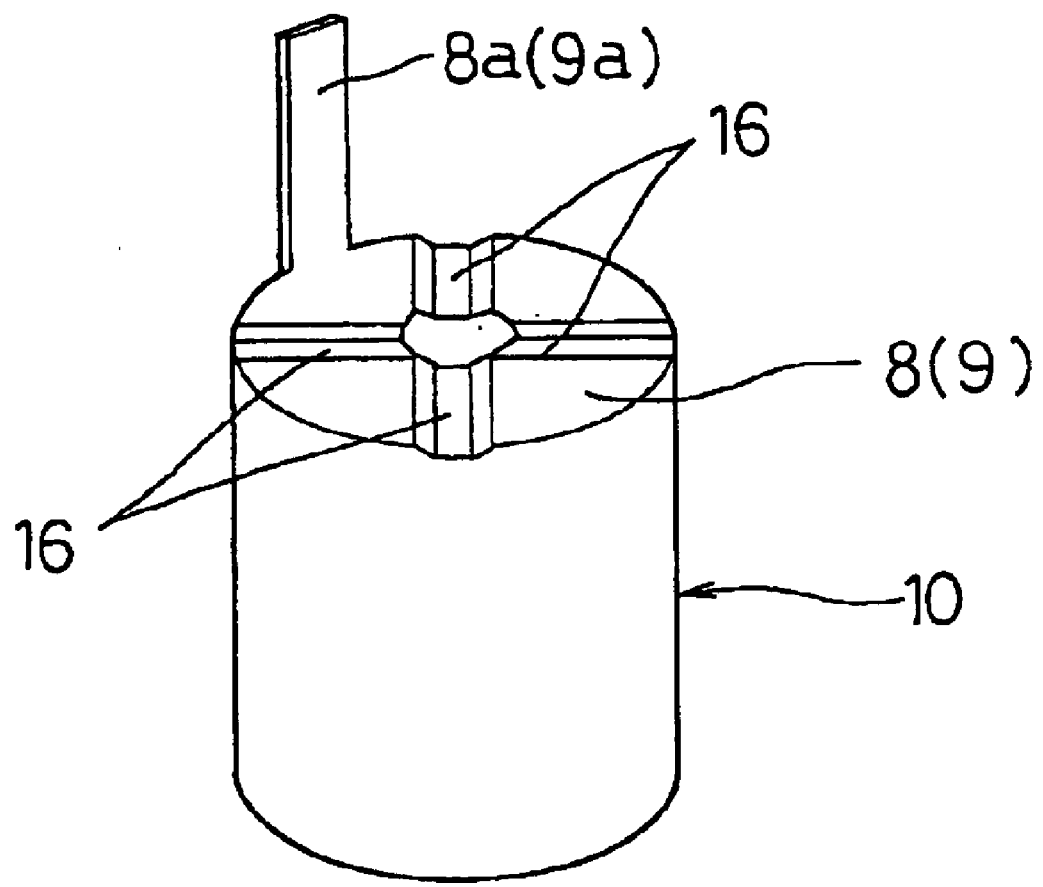
FIG. 4 is a perspective view of a modified example of current collecting plate in a state welded to the electrode plate group in the rechargeable battery according to the present invention.
Figure 5:
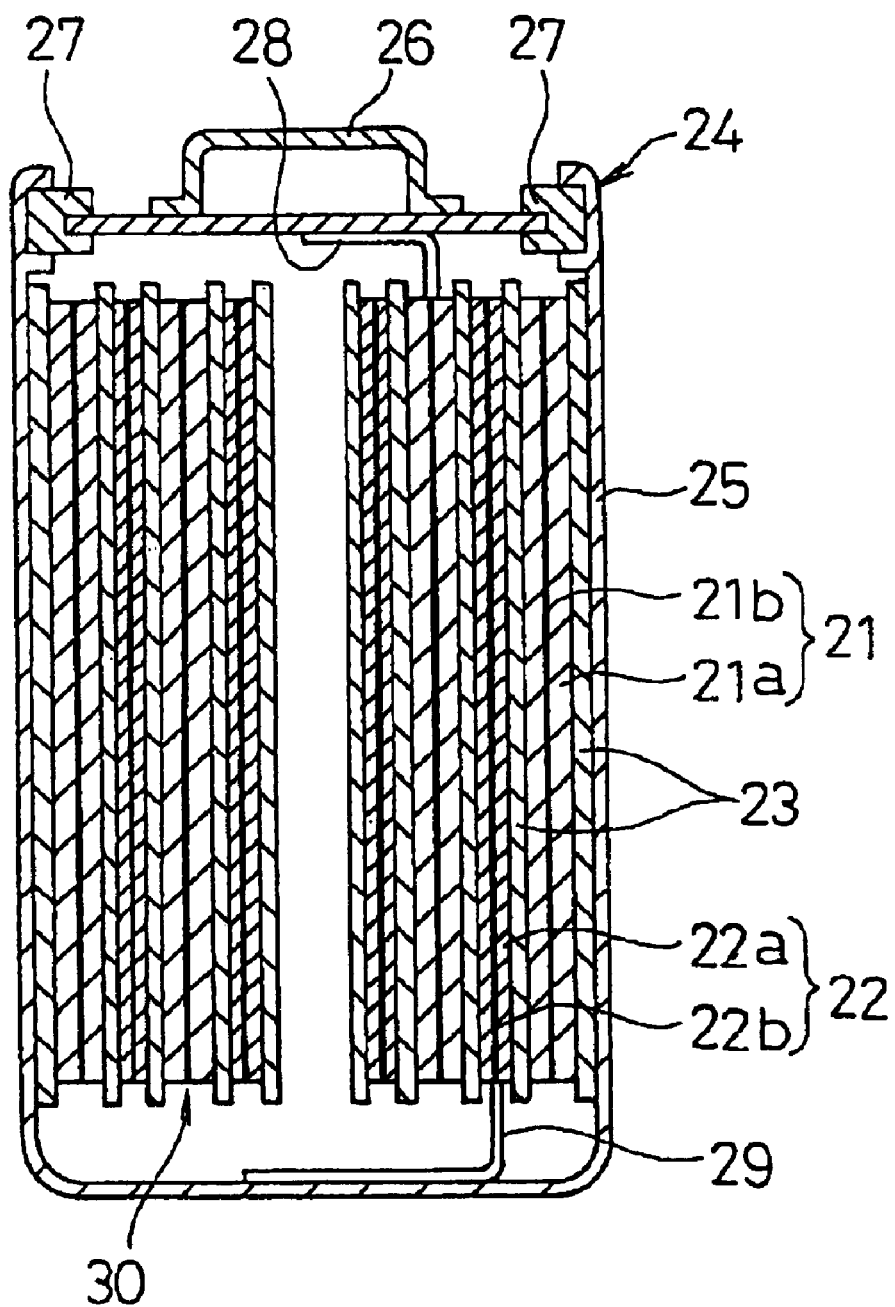
FIG. 5 is an axial cross-sectional view of a rechargeable battery according to an example of the prior art.

In the description of the above embodiment, an example was given in which the entire surface of the current collecting plates 8, 9 was of flat plate shape. FIG. 4 illustrates a modified example of a current collecting plate 8 or 9, in which a plurality of ribs 16 are formed projecting towards the projected portions of the current collectors 1b, 2b of the electrode plate group 10 in radial fashion. Laser welding is effected along these ribs 16 under a condition in which the current collecting plates 8, 9 are pressed toward the electrode plate group 10 such that these ribs 16 bite into the projected portions of the current collectors 1b, 2b so as to form the flat planes 11, 12.

If such ribs 16 are provided on the current collecting plates 8, 9 and laser welding is conducted with these being pressed against the projected portions of the current collectors 1b, 2b, the flat planes 11, 12 formed by the projected portions make reliable contact with the current collecting plates 8, 9 through the ribs 16, whereby the current collecting plates 8, 9 and the current collectors 1b, 2b can be welded together even more reliably.

INDUSTRIAL APPLICABILITY

As will be clear from the above description, with the rechargeable battery of the present invention, the current collector of one or other of the electrodes projects on at least one side of the electrode plate group, a flat plane being formed at the tip of this projected portion by itself, and a current collector plate is welded to this projected portion of the current collector. Accordingly, the current collection efficiency is high and the rise in temperature during charging/discharging can be made small. Since the flat plane is formed by the current collector itself, an inexpensive construction can be achieved, and since the current collecting plate is joined to the flat plane, the construction is stable with regard to vibration etc. The present invention thereby realizes an inexpensive structure for electrode plate group with which the battery exhibits excellent current collection efficiency and stable charging/discharging characteristics.

What is claimed is:

1. A method of manufacturing a rechargeable battery, comprising the steps of:

interposing a separator between a positive electrode plate and a negative electrode plate to form a multilayer electrode structure, said positive electrode plate and said negative electrode plate including uncoated end portions;

winding said multilayer electrode structure in spiral fashion to form an electrode plate group having a spiral configuration, said positive electrode plate, said negative electrode plate and said separator being positioned relative one another prior to the winding of said multilayer structure such that after being wound the uncoated end portions of said positive electrode plate and said negative electrode plate extend respectively from opposite ends of the electrode plate group thereby defining uncoated projected portions;

inserting said electrode plate group into a jig cavity in a molding jig having a generally cylindrical interior configuration, the electrode plate group being positioned with a winding axis thereof generally codirectional with a central axis of the jig cavity, said jig cavity having an opening at one end thereof;

subjecting said electrode plate group to pressure by a pressing member inserted via said opening and moved in a direction of said winding axis to bend the uncoated projected portions of said positive electrode plate and said negative electrode plate in a radially inward direction of the spiral configuration of the electrode plate group to form flattened regions on the apposite ends of the electrode plate group which approximate respective flat planes extending orthogonally to the winding axis of said electrode plate group;

removing said electrode plate group from the molding jig;

pressing a positive electrode current collecting plate and a negative electrode current collecting plate into contact with the flattened regions on respective ones of the opposite ends of the electrode plate group corresponding to the positions of the uncoated projected portions of the positive electrode plate and the negative electrode plate; and welding the current collecting plates to the electrode plate group at a plurality of locations within the flattened regions.

2. The method of manufacturing a rechargeable battery according to claim 1, wherein said step of welding includes laser-welding the current collecting plates in a circumferential direction of surfaces of the current collecting plates in radial fashion from a middle towards an outer periphery of the electrode plate group to form an electrode plate group assembly.

3. The method of manufacturing a rechargeable battery according to claim 1 or 2, further comprising the steps of:

accommodating said electrode plate group assembly in a battery case; and vacuum-impregnating the electrode plate group assembly within the battery case with an electrolyte.

4. The method of manufacturing a rechargeable battery according to claim 3, further comprising the steps of:

connecting the current collecting plates each to a respective one of a battery closure and the battery case; and sealing the battery case with the battery closure.

* * * * *